(12) United States Patent
Huang et al.

(10) Patent No.: US 9,465,655 B2
(45) Date of Patent: Oct. 11, 2016

(54) METHOD FOR MANAGING THREADS USING EXECUTING TIME SCHEDULING TECHNIQUE AND ELECTRONIC DEVICE USING THE SAME METHOD

(71) Applicant: HTC Corporation, Taoyuan County (TW)

(72) Inventors: Pei-Hao Huang, Taoyuan County (TW); Pei-Jun Ko, Taoyuan County (TW); Yuan-Yao Tu, Taoyuan County (TW); Chih-Chun Wei, Taoyuan County (TW); Yu-Hsien Yang, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 518 days.

(21) Appl. No.: 13/686,928

(22) Filed: Nov. 28, 2012

(65) Prior Publication Data

US 2014/0149988 A1 May 29, 2014

(51) Int. Cl.
*G06F 9/48* (2006.01)
*G06F 9/46* (2006.01)

(52) U.S. Cl.
CPC ............. *G06F 9/485* (2013.01); *Y02B 60/144* (2013.01)

(58) Field of Classification Search
None
See application file for complete search history.

(56) References Cited

U.S. PATENT DOCUMENTS

| | | | | |
|---|---|---|---|---|
| 6,026,427 | A * | 2/2000 | Nishihara | G06F 9/52 718/102 |
| 2006/0294522 | A1* | 12/2006 | Havens | G06F 9/4887 718/103 |
| 2009/0037927 | A1* | 2/2009 | Sangili et al. | 718/108 |
| 2011/0113406 | A1* | 5/2011 | Flemming et al. | 717/128 |

FOREIGN PATENT DOCUMENTS

| | | |
|---|---|---|
| CN | 101122870 | 2/2008 |
| CN | 101627367 | 1/2010 |
| CN | 101853180 | 10/2010 |
| CN | 101964724 | 2/2011 |
| EP | 2137627 | 12/2009 |

OTHER PUBLICATIONS

Office Action of China Counterpart Application, issued on Jul. 29, 2016, p. 1-p. 7, in which the listed references were cited.

* cited by examiner

*Primary Examiner* — Eric C Wai
(74) *Attorney, Agent, or Firm* — Jianq Chyun IP Office (57) ABSTRACT

A method for managing threads and an electronic device using the method are provided. In the method, a current time is obtained. A time interval from now to a time for the processor to wake up next time is calculated. The processor is released until reaching the end of the time interval. When the end of the time interval is reached or a first notice signal of the processor is received, a first newest time is obtained to update a current time, and the current time is logged as a basis time. It is respectively checked whether the current time satisfies a plurality of predetermined time conditions of the registered threads against a plurality of registered threads in the threads. When the current time satisfies the predetermined time condition of a first registered thread among the registered threads, the first registered thread is waked up.

25 Claims, 8 Drawing Sheets

METHOD FOR MANAGING THREADS USING EXECUTING TIME SCHEDULING TECHNIQUE AND ELECTRONIC DEVICE USING THE SAME METHOD

BACKGROUND OF THE INVENTION

1. Field of the Invention

The invention generally relates to a thread-managing mechanism, and more particularly, to a method for managing threads by using an executing time scheduling technique and an electronic device using the same method.

2. Description of Related Art

The applications used on an electronic device currently are developed towards diversification and have a plurality of threads usually requiring simultaneously be operated. When each of independently running threads is to be operated, the operation system (OS) would wake up the processor to execute one or multiple threads to be processed. At the time, the usage durations of the processor may be too dense so as to reduce the time for the processor to enter an idle mode and further consume too much power.

Figure 1A:
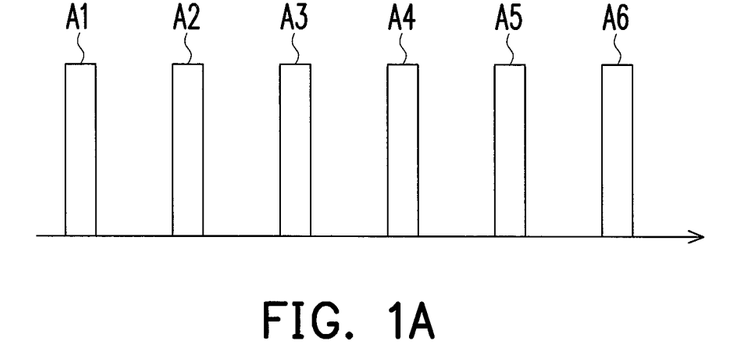
FIGS. 1A-1C are schematic diagrams showing an executing timing of threads and a processor.
Figure 1B:
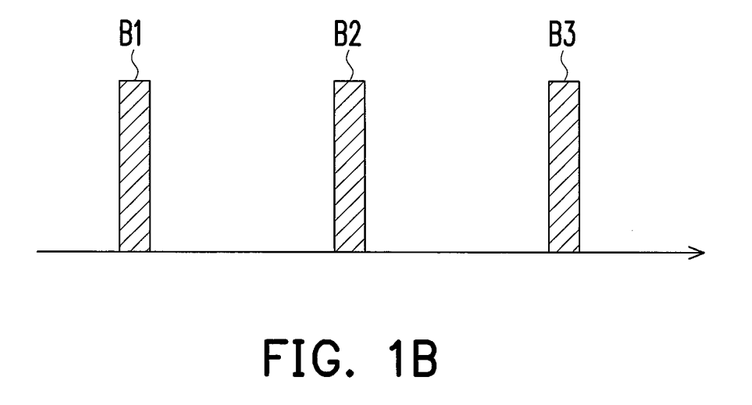
Figure 1C:
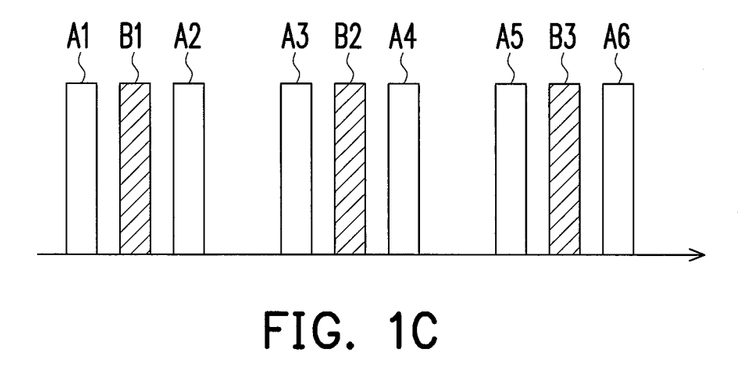

FIGS. 1A-1C are schematic diagrams showing an executing timing of threads and a processor. Referring to FIG. 1, the abscissa herein represents time and the coordinate towards right direction means an increased time, and six time-points A1-A6 on the time axis represent six executing times of the thread A to be executed. It can be seen from FIG. 1A the executing cycle of the thread A is, for example, 100 ms. Referring to FIG. 1B, three time-points B1-B3 on the time axis represents three executing times of the thread B to be executed, while in FIG. 1B, the executing cycle of the thread B is, for example, 200 ms.

The threads A and B are independently running threads. When both the threads A and B need to be executed, the processor would be waked up to execute the threads A and B at appropriate time-points. FIG. 1C is a schematic diagram where the executing timing for the threads A and B is not properly scheduling-managed. It can be seen from FIG. 1C the processor needs to process the thread A or B every 50 ms in shortest situation. Such a too high operation frequency brings a problem of too dense executing periods at the peak duration, and the processor has no sufficient time to enter an idle mode so as to consume higher power. In this regard, how to effectively schedule multiple threads to reduce the power consumption of the processor becomes a project issue to be solved in the field.

SUMMARY OF THE INVENTION

Accordingly, the invention is directed to a method for managing threads and an electronic device thereof, wherein a thread manager in the OS is used to plan and schedule the executing times of multiple threads in a memory so as to reduce the usage frequency of the processor and further reduce unnecessary power consumption.

The invention provides a method for managing threads. According to an embodiment of the invention, the method is suitable for an electronic device. In the method, a current time is obtained. A time interval from the current time to a time for the processor to wake up next time is calculated. The processor is released until reaching the end of the time interval. When the end of the time interval is reached or a first notice signal of the processor is received, a first newest time is obtained to update a current time, and the current time is logged as a reference timecount. It is respectively checked whether the current time satisfies a plurality of predetermined time conditions of the registered threads against a plurality of registered threads in the threads. When the current time satisfies the predetermined time condition of a first registered thread among the registered threads, the first registered thread is waked up.

The invention also provides an electronic device, which includes a memory and a processor according to an embodiment of the invention. The memory includes an OS and a plurality of threads, in which the OS includes a thread manager and the processor is used to execute the OS, the thread manager and the threads. The thread manager obtains a current time and calculates a time interval from now to the next waking-up time-point for the processor. Until reaching the time interval, the thread manager releases the processor. When the thread manager judges out reaching the time interval or receiving a first notice signal of the processor, the thread manager obtains a first newest time to update the current time, logs the current time as a reference timecount and respectively checks whether or not the current time satisfies a plurality of predetermined time conditions of the registered threads against a plurality of registered threads among the threads. When the current time satisfies the predetermined time condition of a first registered thread among the registered threads by judgement, the thread manager wakes up the first registered thread.

Based on the description above, in the method for managing threads and the electronic device thereof of the embodiment, a thread manager registers or enrolls a plurality of threads and, according to the corresponding predetermined time condition for executing intervals of each of the registered threads, plans the executing flow of the processor and wakes up the thread satisfying the corresponding predetermined time condition so as to increase the released time of the processor and further save the power consumption.

Other objectives, features and advantages of the present invention will be further understood from the further technological features disclosed by the embodiments of the present invention wherein there are shown and described preferred embodiments of this invention, simply by way of illustration of modes best suited to carry out the invention.

DESCRIPTION OF THE EMBODIMENTS

Figure 2:
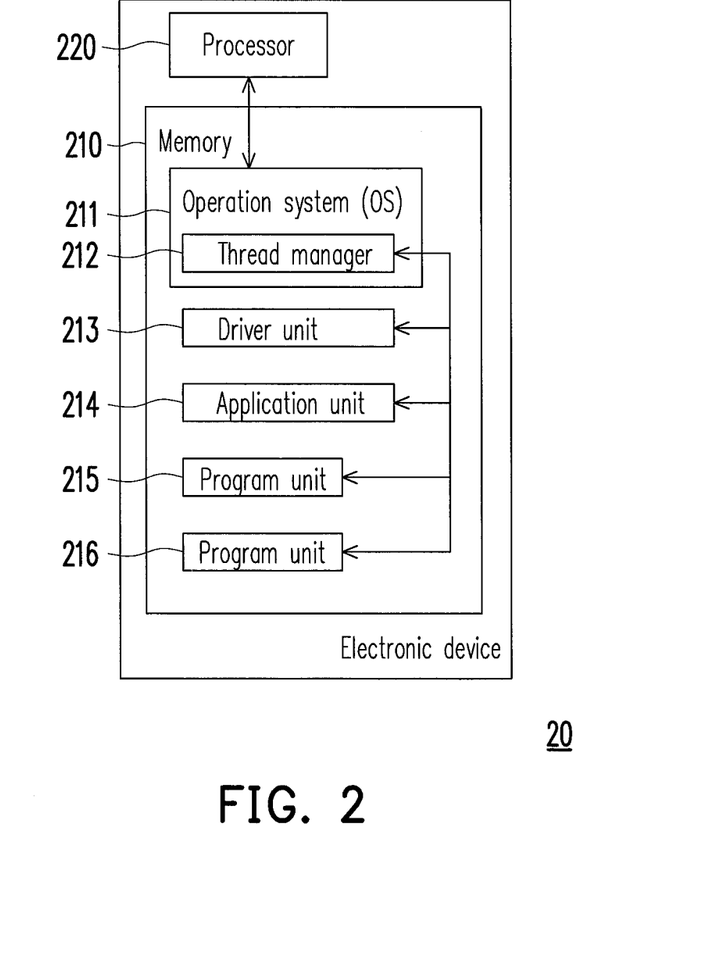
FIG. 2 is a function block chart of an electronic device according to an embodiment of the invention.

FIG. 2 is a function block chart of an electronic device according to an embodiment of the invention. Referring to FIG. 2, the electronic device 20 includes a memory 210 and a processor 220. The processor 220 connects to and can access the memory 210. The memory 210 stores program codes or instructions for an operation system (OS) 211, a driver unit 213, an application unit 214 and two program units 215 and 216. The program source codes or instructions are respectively corresponding to a plurality of threads and executed by the processor 220. In addition, the OS 211 includes a thread manager 212, which can be executed by the processor 220, may manage executing timing of a plurality of threads in the electronic device 20. The processor 220 is, for example, a central processing unit (CPU) or a processor circuit with combination of multiple processor cores.

In more details, the thread manager 212 can register or enroll the plurality of threads in the electronic device 20, but not all the threads in the electronic device 20 are registered with the thread manager 212. The thread manager 212 may include a database (not shown) for logging the registered threads and the corresponding predetermined time conditions. The thread manager 212 obtains a current time which can be a system time provided by the processor 220. The thread manager 212 uses the current time to calculate a time interval or a period for the processor 220 to wake up at the next time. In addition, time interval the thread manager 212 releases the processor 220 until the interval is passed. That is to say, the thread manager 212 releases the processor 220 until the end of the interval is reached time interval so that the processor 220 does not execute the registered threads during the interval. When the processor 220 does not need to execute the registered threads managed by the thread manager 212, the processor 220 may enter an idle mode or execute the unregistered threads.

When the thread manager 212 receives a first notice signal (or a first notice message) from the processor 220 prior to reaching the end of the interval time interval, the thread manager 212 obtains a first newest time to update the current time and logs the current time as a reference timecount. The reference timecount represents the time for the processor 220 to completely execute the last one of the registered threads. Then, the thread manager 212 respectively checks whether or not the updated current time satisfies a plurality of predetermined time conditions of the registered threads in the memory 210. When the thread manager 212 finds that the current time satisfies the predetermined time condition of one of the registered threads, the thread manager 212 wakes up the registered thread and the processor 220 executes the first registered thread. The predetermined time condition of the registered thread includes, for example, an ideal time interval, a maximum allowed-time interval and a minimum allowed-time interval of the registered threads.

Figure 3:
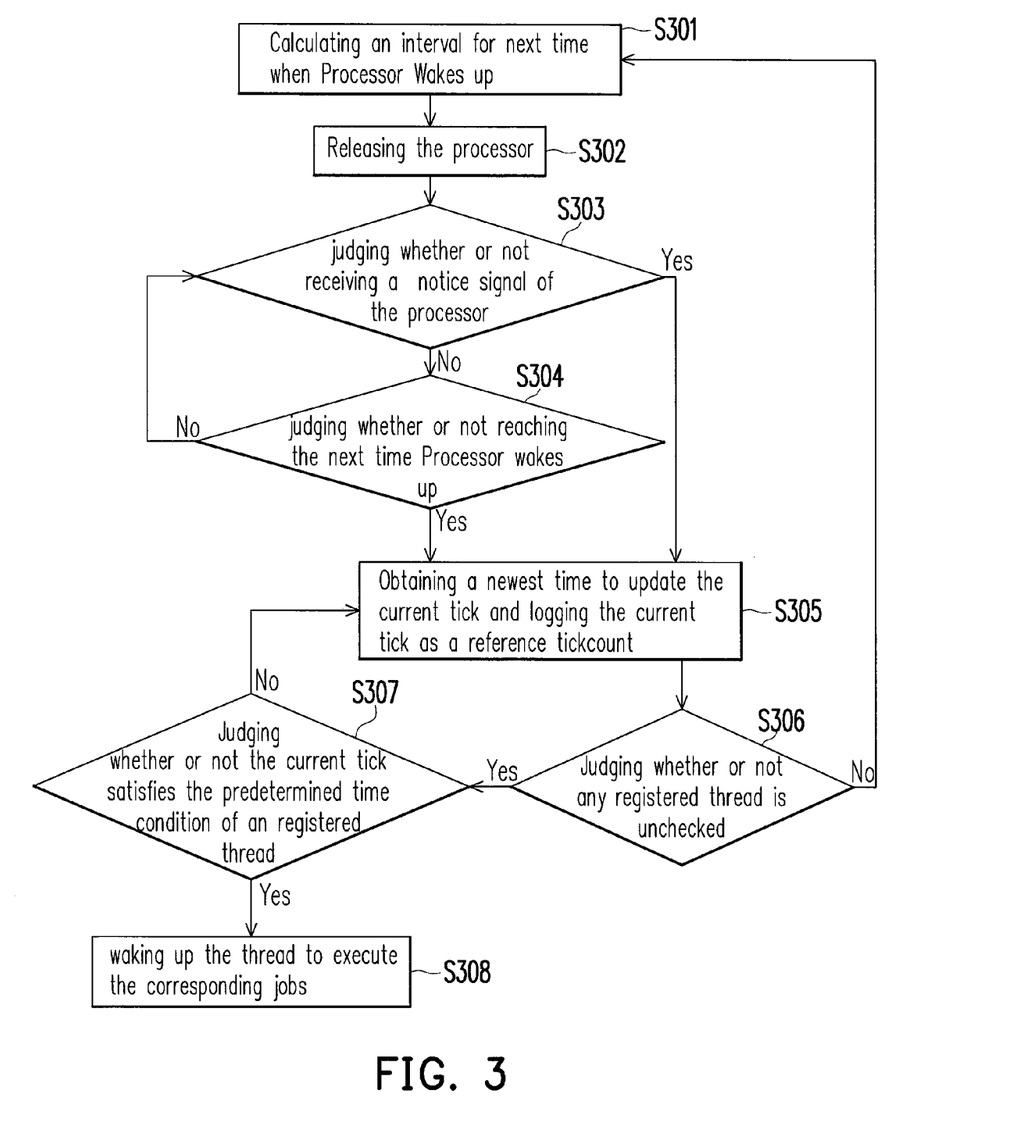
FIG. 3 is a flowchart of a method for managing threads according to an embodiment of the invention.

FIG. 3 is a flowchart of a method for managing threads according to an embodiment of the invention. Referring to FIGS. 2 and 3, the method for managing threads 300 begins with step S301. In step S301, the thread manager 212 obtains the current time (for example, by using a function of software predetermined to obtain the system time) and calculates a time interval from current time to the time that the processor 220 wakes up at next time. One embodiment for the thread manager 212 to calculate the time interval is described in following referring to FIG. 5.

In step S302, during the time interval, the thread manager 212 releases the processor 220 to conduct other tasks or make the processor 220 in a power-saving state (for example, entering an idle mode or a stand-by mode). Then in step S303, the thread manager 212 judges whether or not a first notice signal is received from the processor 220 until reaching the end of the time interval. The first notice signal is, for example, a notice signal produced by the processor 220 waked up by other unregistered threads. The notice signal notifies the thread manager 212 that the processor 220 is not in the idle mode or stand-by mode. In step S303, if the thread manager 212 receives the first notice signal, step S305 is conducted after step S303; if the thread manager 212 does not receive the first notice signal, step S304 is conducted after step S303.

In step S304, the thread manager 212 further judges whether or not the current time has reached the time point that the processor 220 wakes up at next time, i.e., whether or not the end of the time interval calculated in step S301 has been reached. In step S304, if the thread manager 212 has judged out the end of time interval is reached, the flow goes to step S305 after step S304; if the thread manager 212 determines that the end of the time interval calculated in step S301 has not been reached, the processor 220 keeps in released state and does not execute any registered thread, and the flow goes back to step S303 after step S304 for reconfirming.

As the aforesaid description, both of the situations that when the time point that the processor 220 wakes up at next time is reached or when the first notice signal from the processor 220 is received, step S305 will be executed. In step S305, the processor 220 has begun with executing one or a plurality of threads stored in the memory 210 and the threads may be registered threads or non-registered threads. In order to update the executing log of the processor 220, in step S305, the thread manager 212 would obtain a first newest time to update the current time and log the current time as a reference timecount. The reference timecount represents the time point for the processor 220 to execute anyone of the registered threads last time or mostly recent time (or referred as "last round timecount").

Step S306 is followed after step S305. In step S306, the thread manager 212 judges whether or not there is any registered thread remaining unchecked. In step S306, if the thread manager 212 judges that there is still at least one registered thread remaining unchecked, the flow goes to step S307 after step S306. If the thread manager 212 judges that no more registered thread remaining unchecked, the flow goes back to step S301 after step S306 to recalculate a time interval and makes the processor 220 resume to the released state again.

In step S307, the thread manager 212 selects a registered thread from one or a plurality of unchecked registered threads to judge whether or not the current time satisfies the predetermined time condition of the registered threads. In step S307, when the thread manager 212 judges the current time does not satisfy the predetermined time condition of the registered thread which is presently checked, the flow goes to step S305 after step S307 and the current time is updated and is set as the reference timecount again. Further, in step S307, when the thread manager 212 judges that the current time satisfies the predetermined time condition of the registered thread presently checked, the flow goes to step S308 after step S307. In step S308, the thread manager 212 wakes up the registered thread and the processor 220 executes the relevant steps of the registered thread (or allows the threads executing the corresponding jobs).

In another aspect of view, the entire steps S305, S306 and S307 function to respectively check whether or not the current time satisfies the predetermined time condition of each of the registered threads logged by the thread manager 212.

Figure 6:
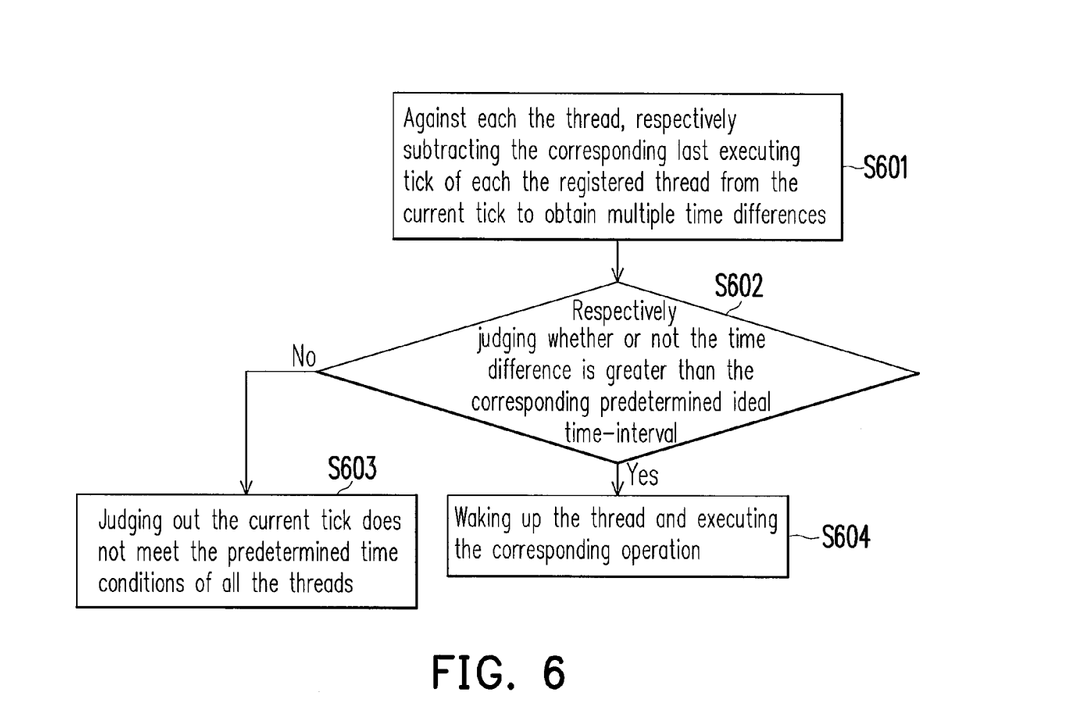
FIG. 6 is a flowchart of a method for checking whether or not the current time satisfies the predetermined time conditions of thread according to an embodiment of the invention.
Figure 7:
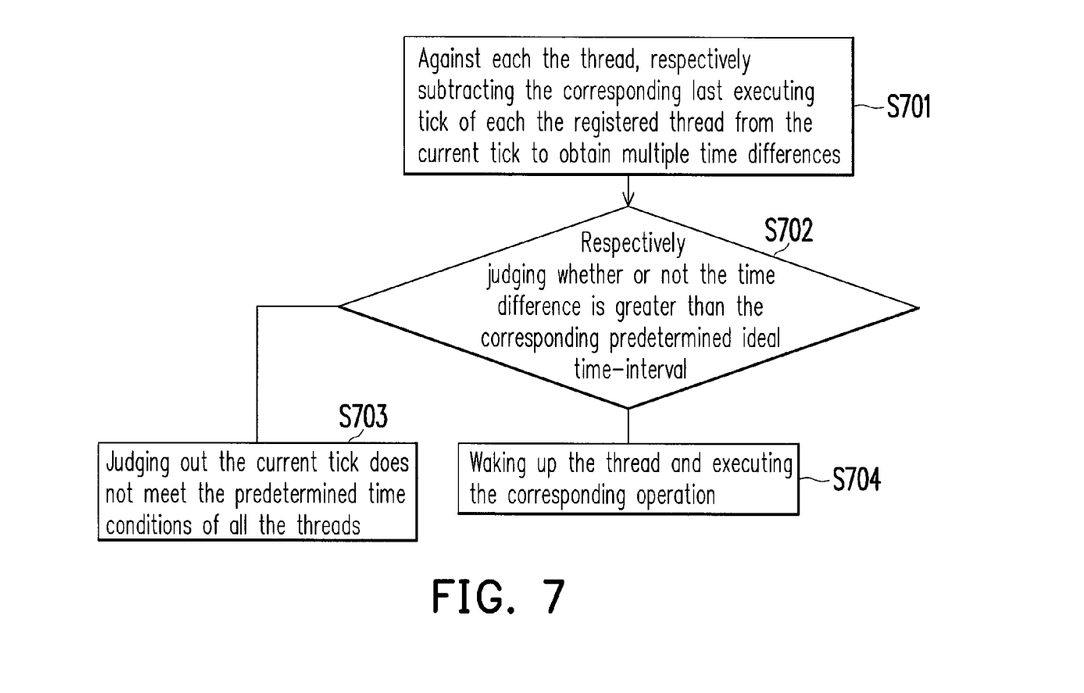
FIG. 7 is a flowchart of another method for checking whether or not the current time satisfies the predetermined time conditions of thread according to an embodiment of the invention.

If the processor 220 is waked up due to the thread manager 212 reaches the end of the time interval, the details of the judgement are described as shown by FIG. 6, in one of embodiments. If the processor 220 is waked up due to receiving the first notice signal of the processor 220 prior to the end of the time interval, the details of the judgement are described as shown by FIG. 7, in another embodiment.

Figure 4A:
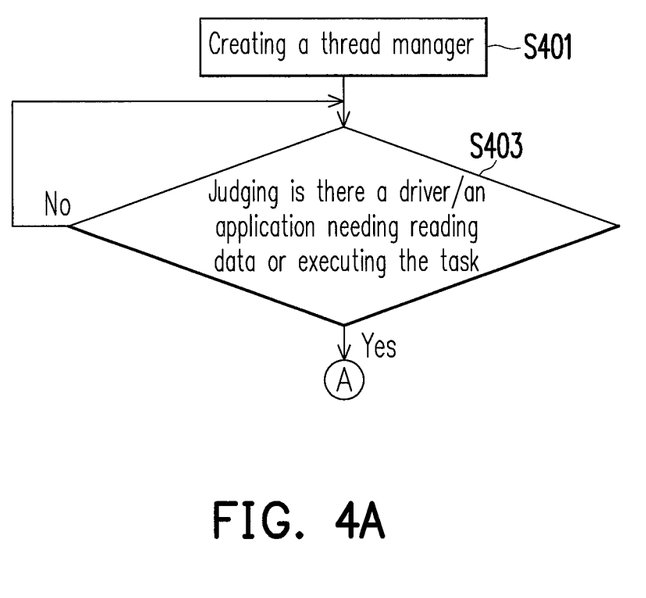
FIGS. 4A-4C are flowcharts of a method for managing threads according to an embodiment of the invention.
Figure 4B:
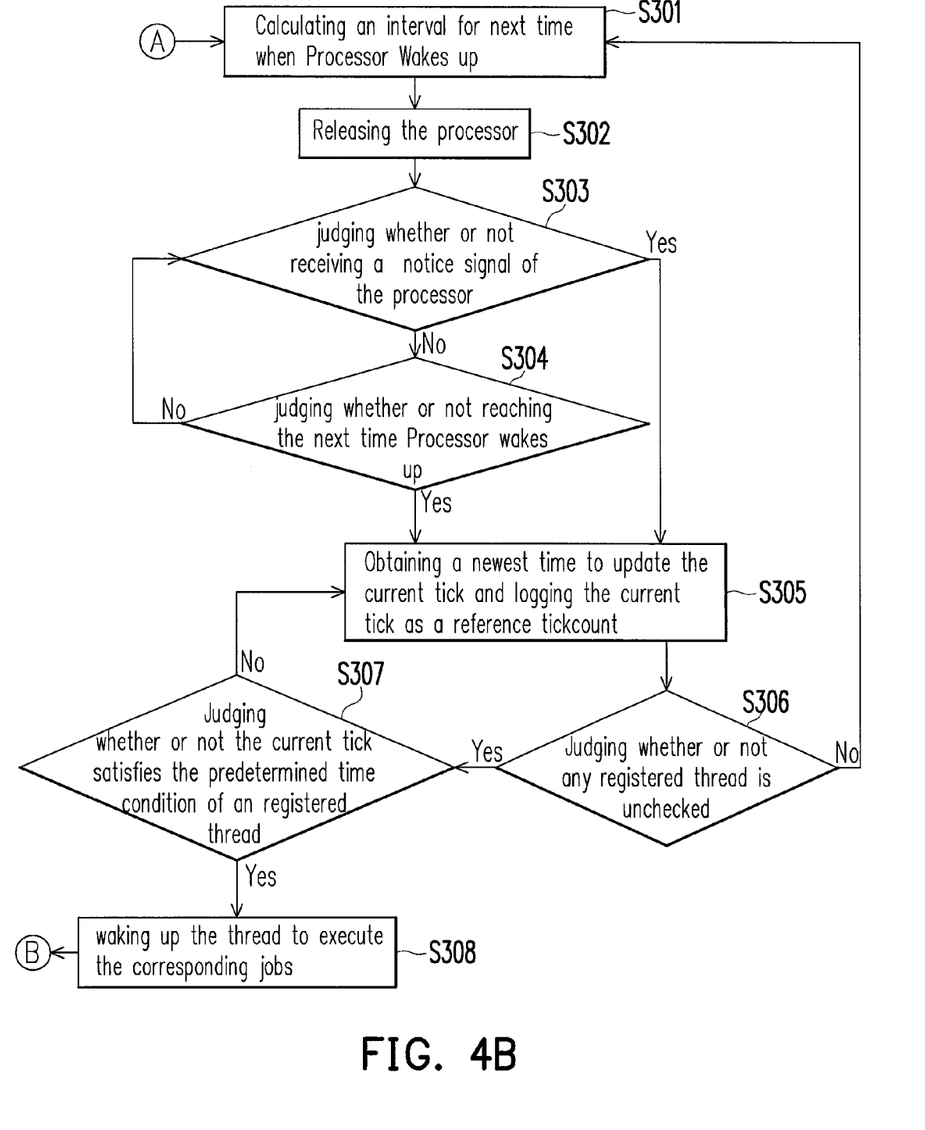
Figure 4C:
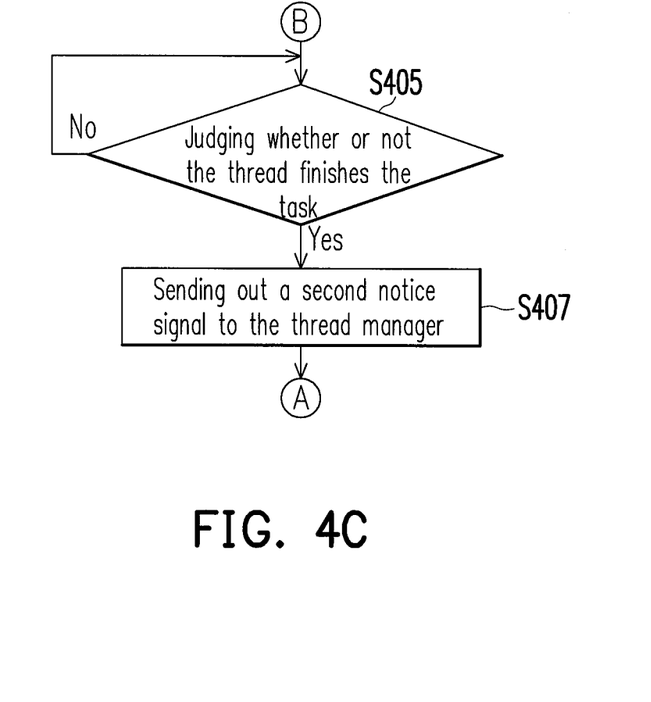

FIGS. 4A-4C are flowcharts of a method for managing threads according to an embodiment of the invention. Referring to FIGS. 2, 4A-4C, in the embodiment, step S301-step S308 in FIG. 4B are similar to step S301-step S308 in FIG. 3. Therefore, the relevant details can refer to FIG. 3, which is omitted to describe.

Referring to FIGS. 2 and 4A, in step S401, a thread manager 212 is created in the OS 211. Source codes of programs of the thread manager 212 are stored in the memory 210. When the processor 220 processes the codes of the relevant program of the thread manager 212, the thread manager 212 can schedule for one or a plurality of registered threads and plan the usage time schedule of the processor 220, which further makes the executing times of the registered threads conformable to the cycle of the power-saving mode of the processor 220 as much as possible. In this way, the frequency for the processor 220 to be waked up from the power-saving mode (or the idle mode) can be reduced, i.e., the busy time of the processor 220 is reduced.

The step of registering threads includes using a table (such as the following Table 1), a data structure (not shown) in the memory 210 or a database (not shown) in the memory 210 to respectively log the ideal time interval, the maximum allowed time interval and the minimum allowed time interval of the registered threads. In order to make the thread have flexibility to implement, the difference between the maximum allowed time interval and the minimum allowed time interval is greater than or equal to a unit time in an idle mode of the processor (or referred as "CPU_IDLE_RE-QUIRE_TIME").

In the embodiment, there are some threads remaining unregistered with the thread manager 212 in the memory 210. Since these unregistered threads are not subject to the control or managing by the thread manager 212, when one of the unregistered threads is operated, the processor 220 would send out a first notice signal to notify the thread manager 212 that the processor 220 is in busy state or is waked up from the idle mode already.

In step S403, the thread manager 212 judges that there is a driver or an application requiring periodically reading/writing data or periodically executing the corresponding tasks, or there is a new thread produced and asking to be registered with the thread manager 212. In step S403, if the thread manager 212 judges that there is no above-mentioned event happens (corresponding to different conditions for executing different threads), then, step S403 is executed repeatedly for reconfirming. If the thread manager 212 judges that the above-mentioned event does happen, then, the flow goes to step S301 after step S403, in which the following details in the steps of 301-308 of FIG. 4B may refer to FIG. 3. That is, since in step S403 there is a thread requiring to execute the corresponding task, or whether or not a new thread is produced and asks for registering with the thread manager 212, so that after step S403 the thread manager 212 requires to obtain a current time again. By using the current time to calculate a time interval from the current time to the time point for the processor 220 to wake up next time.

Referring to FIGS. 2 and 4C, the flow goes to step S405 after step S308. In step S405, the waked up registered thread judges by itself whether or not the task is finished, and when the registered thread finishes the task in step S405, the flow goes to step S407 after step S405. When the registered thread does not finish the task, then, step S405 is executed repeatedly after step S405 for reconfirming.

It is noted that in step S308, when a registered thread is waked up and executes a relevant task, the flow enters step S405 to repeatedly judge whether or not the relevant task is finished by the registered thread, or, in other case that the flow goes to step S405 after finishing all the relevant tasks. If the relevant task is finished, the registered thread would send out a second notice signal to the thread manager 212 in step S407, followed by going to step S301 to obtain a second newest time for updating the current time and using the updated current time to recalculate another time interval from the updated current time to the time point for the processor 220 to wake up next time.

Table 1 is given in following as an exemplary embodiment to explain the predetermined time condition in details, in which the condition includes an ideal time interval, a maximum allowed time interval and a minimum allowed time interval of the registered threads.

TABLE 1

| | last executing time (ms) | time interval (ideal) | time interval (maximum) | time interval (minimum) |
|---|---|---|---|---|
| thread 1 | 150 | 5 | 8 | 0 |
| thread 2 | 200 | 6 | 10 | 1 |
| thread 3 | 150 | 7 | 10 | 2 |
| thread 4 | 100 | 8 | 12 | 5 |

Table 1 lists multiple predetermined time conditions of the threads 1-4. Referring to Table 1, the threads 1-4 in Table 1 are, for example, the driver unit 213, the application unit 214, the program unit 215 and the program unit 216. The predetermined time conditions can be logged when the thread manager 212 registers the threads and can be used for calculating appropriate time intervals later.

The time interval (ideal), the time interval (maximum) and the time interval (minimum) of the threads 1-4 are respectively times of the unit time in the idle mode of the processor. In Table 1, only times (or multipliers) of the unit time in the idle mode are given, and the unit of any one of these numbers is millisecond (ms). The last executing time is also rounded to be times of the unit time in the idle mode. For example, the last executing time of the thread 1 is 150 ms, while the ideal time interval thereof is 5 times of the unit time in the idle mode, the maximum allowed time interval is 8 times of the unit time in the idle mode and the minimum allowed time interval is 0 time of the unit time in the idle mode, which means after executing the thread 1, the processor 220 immediately processes the thread 1.

In terms of other threads 2-4, the ideal time intervals, the maximum allowed time interval and the minimum allowed time interval thereof can be obtained referring to Table 1. For example, assuming the unit time in the idle mode is 50 ms for the processor, the thread manager 212 can deduct the ideal time interval to wake up the thread 1 next time is 400 ms (150+50×5=400). Similarly, from Table 1, the maximum allowed time interval to wake up the thread 1 next time is 550 ms (150+50×8=400), and the minimum allowed time interval to wake the thread 1 next time is 150 ms (150+50× 0=150) by deduction. According to the above-mentioned principle, the time intervals (ideal), the time intervals (maximum) and the time intervals (minimum) of the threads 2-4 can be deducted.

It is noted that the last executing time of each thread in Table 1 would continuously be updated once the thread manager 212 obtains a newest current time.

Figure 5:
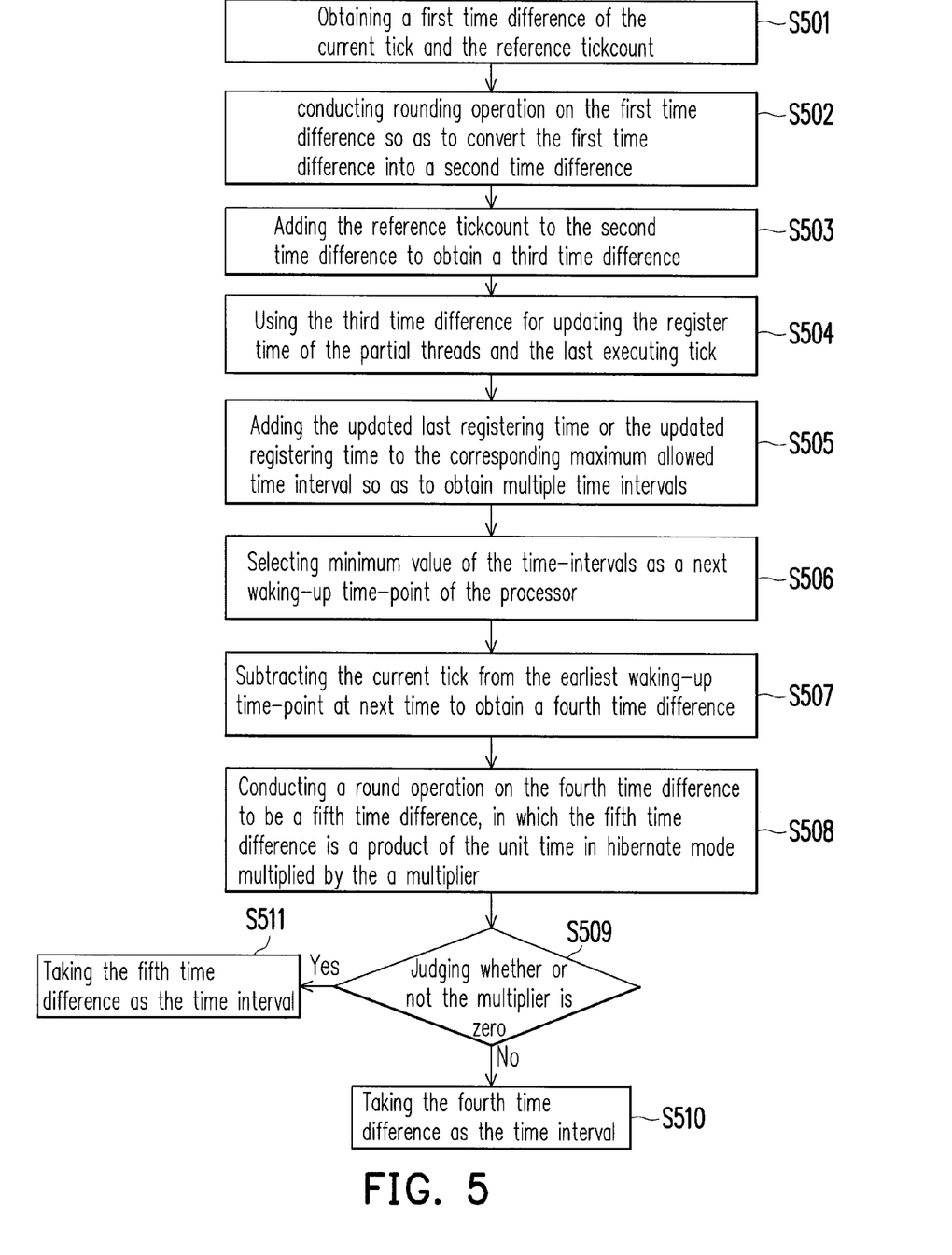
FIG. 5 is a flowchart of a method for calculating an appropriate time interval according to an embodiment of the invention.

FIG. 5 is a flowchart of a method for calculating an appropriate time interval according to an embodiment of the invention. Referring to FIG. 5, the method of calculating appropriate time intervals can refer to the description of step S301 in FIG. 3, and the method begins with step S501. In step S501, the thread manager 212 obtains a second newest time to update the current time. A time difference is obtained as a first time difference by subtracting the ending time (or the reference timecount) for the processor 220 to lastly execute anyone of the registered threads from the current time.

Next in step S502, the thread manager 212 conducts a rounding operation on the first time difference so as to adjust the first time difference into the times of the unit time in the idle mode. The adjusted first time difference is converted into a second time difference defined by a product of the unit time in the idle mode and the first multiplier, in which the first multiplier is a factor of times. For example, if the unit time in the idle mode is 50, then, the rounding operation takes 25 as a unit. Further, if the first time difference is greater than or equal to 25, the first multiplier will be 1 and therefore the second time difference is 50. If the unit time in the idle mode is 50, then the rounding operation takes 25 as a unit. Moreover, if the unit time in the idle mode is less than 25, the first multiplier will be 0 and therefore the second time difference is 0. In this way, the time difference is adjusted to times of the unit time in the idle mode, so that the processor 220 has sufficient time to enter the idle mode.

In step S503, the thread manager 212 adds the reference timecount to the second time difference expressed by the times of the unit time in the idle mode so as to obtain a third time difference. The third time difference is the last executing time of a registered thread just finishing the execution or the registering time of a lastly-joined thread (referring to FIGS. 4A and 4C, the time-point to enter step S301 is just the registering time for the registered thread or the executing ending time). In step S504 therefore, the thread manager 212 can further use the third time difference for respectively updating the last registering time of one or multiple newly-joined threads in the duration from the reference timecount to the second newest time. The thread manager 212 can further use the third time difference for updating the last executing time at which one of the registered threads in the duration from the reference timecount to the second newest time is just executed. In this way, the last registering time of the partial registered threads or the last executing time would be adjusted to have a same time point.

In step S505, the thread manager 212 respectively adds the updated registering time of the newly-joined thread (or the newly-registered thread) or the last executing time of a registered thread which is just executed to the corresponding maximum allowed time interval so as to obtain multiple time intervals.

In step S506, the thread manager 212 selects a minimum time interval from the time intervals as a next waking-up time of the processor and updates the time interval by using the time point. The above-mentioned time interval is a time interval from now to an earliest time for the processor 220 to wake up next time, referred as the earliest waking-up time point. During the time interval, the thread manager 212 makes the processor 220 in released state, and the calculation method of the time interval is described as follows.

In step S507, the thread manager 212 subtracts the current time from the earliest waking-up time point to obtain a time interval as a fourth time difference. The fourth time difference is a time difference between the current time and the next-time waking-up time point of the processor 220. Then in step S508, the thread manager 212 conducts a round operation on the fourth time difference to be a times of the unit time in the idle mode so as to obtain a fifth time difference, in which the fifth time difference is a product of the unit time in the idle mode and the second multiplier.

In step S509, the thread manager 212 judges whether or not the second multiplier is zero. In step S509, when the thread manager 212 judges that the second multiplier is zero, the flow goes to step S510 after step S509; in step S509, when the thread manager 212 judges the second multiplier is not zero, the flow goes to step S511 after step S509.

In step S510, the thread manager 212 takes the non-round fourth time difference as the time interval. In step S511, the thread manager 212 takes the round fifth time difference as the time interval so as to achieve an optimum time usage of the processor 220.

FIG. 6 is a flowchart of a method for checking whether or not the current time satisfies the predetermined time conditions of thread according to an embodiment of the invention. Referring to FIGS. 2 and 6, in the embodiment, when reaching the end of the time interval, the processor 220 ends the released state thereof. In step S601, against all the registered threads, the thread manager 212 respectively subtracts the corresponding last executing times of all the registered threads from the current time to obtain multiple time differences.

Then in step S602, against all the registered threads, the thread manager 212 respectively judges whether or not the above-mentioned calculated time differences are greater than or equal to the corresponding predetermined ideal time intervals of the registered threads. That is, in step S602, the thread manager 212 respectively judges whether or not the corresponding time differences of the registered threads are greater than or equal to the corresponding predetermined ideal time interval. In step S602, if the thread manager 212 judges the corresponding time difference of one registered thread is greater than or equal to the corresponding predetermined ideal time interval, the flow goes to step S604 after step S602, where the thread manager 212 judges the current time meets the predetermined time conditions of the registered thread. In step S604, the thread manager 212 wakes up the registered thread and the processor 220 executes the corresponding operation of the registered thread.

In step S602, if the thread manager judges the corresponding time difference of one registered thread is less than the corresponding predetermined ideal time interval, the flow goes to step S603 after step S602, where the thread manager 212 judges out the current time does not meet the predetermined time conditions of the registered thread.

FIG. 7 is a flowchart of another method for checking whether or not the current time satisfies the predetermined time conditions of thread according to an embodiment of the invention. Referring to FIGS. 2 and 7, in the embodiment, since the thread manager 212 receives a first notice signal from the processor 220 and is aware of the processor 220 has ended the released state thereof. The situation corresponding to the first notice signal is, for example, the user has input action and the processor 220 needs to process the input action so as to be waked up. Therefore, the thread manager 212 needs to re-schedule the time interval for the processor 220 to be waked up next time, so that the estimated executing time of the thread is conformable to the time interval for the processor to be waked up next time as much as possible, or the estimated executing time of the thread is synchronized with the time interval for the processor 220 to be waked up next time. In step S701, the thread manager 212 obtains the current time and multiple time differences by respectively subtracting the last executing times corresponding to the registered threads from the executing time.

Then in step S702, against all the registered threads, the thread manager 212 respectively judges whether or not the above-mentioned time differences are greater than or equal to the corresponding minimum ideal time interval of the registered threads. That is, similarly to step S602, in step S702, the thread manager 212 respectively judges whether or not the corresponding time differences of the registered threads are greater than or equal to the corresponding predetermined ideal time interval.

In step S702, if the thread manager judges out the time difference is less than the corresponding minimum ideal time interval of the registered threads, the flow goes to step S703 after step S702, where the thread manager 212 concludes the current time does not meet the predetermined time conditions of the registered threads. In step S702, if the thread manager judges out the time differences are greater than the corresponding minimum ideal time interval, the flow goes to step S704 after step S702, where the thread manager 212 wakes up the registered thread and the processor 220 executes the corresponding operation of the registered thread.

In the embodiment of FIG. 7, when the thread manager 212 adjusts the schedule of each of the registered threads in time to be conformable to the executing cycle of the processor 220, the frequency hopping problem can be reduced. In this regard, in step S702, the thread manager 212 uses the corresponding minimum ideal time interval to judge whether or not the current time meets the predetermined time condition of the registered threads.

The invention also provides a computer program product which stores a computer executable program therein for executing all the steps of the above-mentioned method for managing threads. Basically, the computer program product is composed of a plurality of code snippets (for example, code snippet of establishing organization chart, code snippet of signing forms, code snippet for setting and the code snippet and code snippet of deploying). After the code snippets are loaded into a communication device and executed, the steps of the above-mentioned method for managing threads and the functions of the above-mentioned electronic device can be fulfilled.

In summary, multiple embodiments of the invention provide a method for managing threads and an electronic device thereof. A thread manager in an OS enrolls a plurality of threads and, according to the corresponding predetermined time condition for executing intervals of each of the registered threads, the thread manager plans the executing flow of the processor, or based on the implementation flexibility consideration and in response to the situation of waking up the processor by the non-registered threads, the thread manager wakes up in advance the thread satisfying the corresponding predetermined time condition. In this way, the released time of the processor is increased and the frequency for the processor to enter busy mode from the idle mode is reduced. As a result, the invention can further save the power consumption.

It will be apparent to those skilled in the art that the descriptions above are several preferred embodiments of the invention only, which does not limit the implementing range of the invention. Various modifications and variations can be made to the structure of the invention without departing from the scope or spirit of the invention. The claim scope of the invention is defined by the claims hereinafter.

What is claimed is:

1. A method for managing threads, suitable for an electronic device, the electronic device comprising a processor and a memory, the memory comprising a plurality of threads, the threads comprising at least one registered thread and at least one unregistered thread, the method comprising:
   obtaining a current time and calculating a time interval between the current time and a time for the processor to wake up next time;
   releasing the processor until reaching the end of the time interval;
   when receiving a first notice signal of the processor prior to the end of the time interval, obtaining a first newest time to update the current time, logging the current time as a basis time and respectively checking whether or not the current time satisfies a plurality of predetermined time conditions of the at least one registered thread, wherein the first notice signal indicates the processor is resumed from a power-saving mode to execute the at least one unregistered thread; and
   when the current time satisfies the predetermined time condition of a first registered thread among the registered threads, waking up the first registered thread.

2. The method for managing threads as claimed in claim 1, wherein before calculating the time interval, the method further comprises:
   creating a thread manager; and
   registering a part of the threads as the registered threads by the thread manager.

3. The method for managing threads as claimed in claim 2, wherein the step of judging whether or not reaching the end of the time interval or receiving the first notice signal of the processor comprises:
   judging whether or not receiving the first notice signal of the processor until reaching the end of the time interval, wherein through the first notice signal the processor notifies the thread manager that the processor has been waked up.

4. The method for managing threads as claimed in claim 2, wherein the step of enrolling the registered threads comprises:
   respectively logging an ideal time interval, a maximum allowed time interval and a minimum allowed time interval of the registered threads, wherein a difference between the maximum allowed time interval and the minimum allowed time interval is greater than or equal to a unit time in an idle mode of the processor.

5. The method for managing threads as claimed in claim 4, wherein the step of calculating the time interval comprises:
   obtaining a second newest time to update the current time and obtaining a first time difference by subtracting the basis time from the current time, wherein the basis time is ending time point for the processor to lastly execute anyone of the registered threads;
   performing a rounding operation on the first time difference so as to obtain a product as a second time difference through multiplying the unit time in an idle mode by a first multiplier;
   producing a third time difference through adding the basis time to the second time difference and, by using the third time difference, respectively updating registering times of one or multiple newly registered spreads between the basis time and the second newest time or last executing time of a registered thread among the registered threads;

respectively adding the corresponding maximum allowed time interval to the last executing times of the newly registered spreads or the last executing time of the first registered thread to obtain a plurality of estimated time intervals; and obtaining a minimum estimated time among the plurality of estimated time intervals as an earliest waking up time-point next time of the processor.

6. The method for managing threads as claimed in claim 5, wherein the step of calculating the time interval comprises:

subtracting the current time from earliest waking-up time-point to obtain a fourth time difference and updating the time interval to the fourth time interval;

performing a rounding operation on the fourth time difference so as to obtain a product as a fifth time difference through multiplying the unit time in the idle mode by a second multiplier;

judging whether or not the second multiplier is zero;

when the second multiplier is zero, updating the time interval to the fourth time interval; and when the second multiplier is greater than zero, updating the time interval to the fifth time interval.

7. The method for managing threads as claimed in claim 1, wherein the step of respectively checking whether or not the current time satisfies the predetermined time conditions of the registered threads comprises:

when the current time fails to satisfy the predetermined time condition of the first registered thread checked presently, selecting a second registered thread not yet checked presently and obtaining a second newest time to update the current time.

8. The method for managing threads as claimed in claim 7, wherein the step of respectively checking whether or not the current time satisfies the predetermined time conditions of the registered threads comprises:

when the current time fails to satisfy the predetermined time conditions of the registered threads, repeating the step of obtaining the current time and calculating the time interval.

9. The method for managing threads as claimed in claim 1, wherein after the step of waking up the first registered thread, the method for managing threads further comprises:

when receiving a second notice signal of the first registered thread, obtaining a second newest time to update the current time and recalculating another time interval between the updated current time and a time for the processor to wake up next time, wherein through the second notice signal the first registered thread notifies the thread manager that the first registered thread has finished the executing program thereof.

10. The method for managing threads as claimed in claim 1, further comprising:

when reaching the end of the time interval, obtaining a first newest time to update the current time, logging the current time as a basis time and respectively checking whether or not the current time satisfies a plurality of predetermined time conditions of the at least one registered thread.

11. The method for managing threads as claimed in claim 10, wherein the step of respectively checking whether or not the current time satisfies the plurality of predetermined time conditions of the registered threads against the plurality of registered threads among the threads comprises:

when reaching the end of the time interval, respectively obtaining differences between the current time and last corresponding executing time of the registered threads so as to obtain a plurality of time differences; and against the registered threads, respectively judging whether or not the time differences are greater than or equal to corresponding predetermined ideal time intervals of the registered threads;

when the corresponding time difference of the first registered thread among the registered threads is greater than or equal to the corresponding predetermined ideal time interval, it is judged out the current time satisfies the corresponding predetermined time condition of the first registered thread; and when the corresponding time difference of the first registered thread among the registered threads is less than the predetermined ideal time interval, it is judged out the current time does not satisfy the corresponding predetermined time condition.

12. The method for managing threads as claimed in claim 1, wherein the step of respectively checking whether or not the current time satisfies the plurality of predetermined time conditions among the registered threads against the plurality of registered threads among the threads comprises:

when receiving the first notice signal until reaching the end of the time interval, respectively obtaining the differences between the current time and the corresponding last executing times of the registered threads so as to obtain a plurality of time differences; and respectively against the registered threads judging whether or not the time differences are greater than or equal to corresponding predetermined minimum time intervals of the registered threads;

when the corresponding time difference of the first registered thread among the registered threads is greater than or equal to the corresponding predetermined minimum time interval, it is judged out the current time satisfies the corresponding predetermined time condition of the first registered thread; and when the corresponding time difference of the first registered thread among the registered threads is less than or equal to the predetermined ideal time interval, it is judged out the current time does not satisfy the corresponding predetermined time condition.

13. An electronic device, comprising:

a memory, comprising an operation system and a plurality of threads, wherein the operation system comprises a thread manager and the threads comprises at least one registered thread and at least one unregistered thread; and a processor, used for executing the operation system, the thread manager and the threads, wherein:

the thread manager obtains a current time and calculates a time interval between the current time and a time for the processor to wake up next time;

until reaching the end of the time interval, the thread manager releases the processor;

when the thread manager judges that receiving a first notice signal of the processor prior to the end of the time interval, the thread manager obtains a first newest time to update the current time, logs the current time as a basis time and respectively checks whether or not the current time satisfies a plurality of predetermined time conditions of the at least one registered thread against the at least one registered thread in the threads, wherein the first notice signal indicates the processor is resumed from a power-saving mode to execute the at least one unregistered thread; and when the current time satisfies the predetermined time condition of a first registered thread among the at least one registered thread, the thread manager wakes up the first registered thread.

14. The electronic device as claimed in claim 13, wherein the thread manager registers a part of the threads as the registered threads; and the thread manager respectively logs an ideal time interval, a maximum allowed time interval and a minimum allowed time interval of each of the registered threads, wherein a difference between the maximum allowed time interval and the minimum allowed time interval is greater than or equal to a unit time in an idle mode of the processor.

15. The electronic device as claimed in claim 14, wherein the thread manager respectively logs an ideal time interval, a maximum allowed time interval and a minimum allowed time interval of the registered threads, wherein a difference between the maximum allowed time interval and the minimum allowed time interval is greater than or equal to a unit time in the idle mode of the processor.

16. The electronic device as claimed in claim 15, wherein:

the thread manager obtains a second newest time to update the current time and obtains a first time difference by subtracting the basis time from the current time, wherein the basis time is the ending time point for the processor to lastly execute anyone of the registered threads;

the thread manager performs a rounding operation on the first time difference so as to obtain a product as a second time difference through multiplying the unit time in an idle mode by a first multiplier;

the thread manager produces a third time difference through adding the basis time to the second time difference and, by using the third time difference, respectively updates enrolling times of one or multiple newly registered spreads between the basis time and the second newest time or last executing time of one of the registered threads;

the thread manager respectively adds the corresponding maximum allowed time interval to the last executing times of the newly registered spreads or the last executing time of the first registered thread to obtain a plurality of estimated time intervals; and the thread manager obtains a minimum estimated time among the estimated time intervals as an earliest time point for the processor to wake up next time.

17. The electronic device as claimed in claim 16, wherein:

the thread manager subtracts the current time from the earliest time point for the processor to wake up next time to obtain a fourth time difference and updates the time interval to the fourth time interval;

the thread manager performs a rounding operation on the fourth time difference so as to obtain a product as a fifth time difference through multiplying the unit time in the idle mode by a second multiplier;

the thread manager judges whether or not the second multiplier is zero;

when the second multiplier is zero, the thread manager updates the time interval to the fourth time interval; and when the second multiplier is greater than zero, the thread manager updates the time interval to the fifth time interval.

18. The electronic device as claimed in claim 13, wherein the thread manager further judges whether or not receiving the first notice signal of the processor until reaching the end of the time interval, wherein the processor notifies the thread manager through the first notice signal that the processor has been waked up presently.

19. The electronic device as claimed in claim 13, wherein when the thread manager judges that the current time fails to satisfy the predetermined time condition of the first registered thread checked presently, the thread manager selects a second registered thread not yet checked presently and obtains a second newest time to update the current time and recalculates another time interval from the updated current time to a time for the processor to wake up next time.

20. The electronic device as claimed in claim 19, wherein when the thread manager judges out the current time fails to satisfy the predetermined time conditions of the registered threads, the thread manager obtains a third newest time to update the basis time and recalculates another time interval from now to a time for the processor to wake up next time.

21. The electronic device as claimed in claim 13, wherein when the thread manager receives a second notice signal of the first registered thread, the thread manager obtains a second newest time to update the current time and recalculates another time interval from the updated current time to a time for the processor to wake up next time, wherein the first registered thread notifies the thread manager through the second notice signal that the first registered thread has finished the executing program thereof.

22. The electronic device as claimed in claim 13, wherein when the thread manager judges that reaching the end of the time interval, the thread manager obtains a first newest time to update the current time, logs the current e as a basis time and respectively checks whether or not the current time satisfies a plurality of predetermined time conditions of the at least one registered thread.

23. The electronic device as claimed in claim 22, wherein:

when reaching the end of the time interval, the thread manager respectively obtains differences between the current time and corresponding last executing times of the registered threads so as to obtain a plurality of time differences; and the thread manager respectively against the registered threads judges whether or not the time differences are greater than corresponding predetermined ideal time intervals of the registered threads;

when the thread manager judges that the corresponding time difference of the first registered thread among the registered threads is greater than the corresponding predetermined ideal time interval, the thread manager judges that the current time satisfies the corresponding predetermined time condition of the first registered thread; and when the thread manager judges that the corresponding time difference of the first registered thread among the registered threads is less than or equal to the predetermined ideal time interval, the thread manager judges that the current time does not satisfy the corresponding predetermined time condition.

24. The electronic device as claimed in claim 13, wherein:

when receiving the first notice signal until reaching the end of the time interval, the thread manager respectively obtains the differences between the current time and the corresponding last executing times of the registered threads so as to obtain a plurality of time differences; and the thread manager respectively against the registered threads judges whether or not the time differences are greater than corresponding minimum ideal time intervals of the registered threads;

when the thread manager judges out the corresponding time difference of the first registered thread among the registered threads is greater than the corresponding predetermined ideal time interval, the thread manager judges out the current time satisfies the corresponding predetermined time condition of the first registered thread; and when the thread manager judges out the corresponding time difference of the first registered thread in the registered threads is less than or equal to the corresponding predetermined ideal time interval, the thread manager judges out the current time does not satisfy the corresponding predetermined time condition.

25. A method for managing threads, suitable for an electronic device, the electronic device comprising a processor and a memory, the memory comprising a plurality of threads, the threads comprising at least one registered thread and at least one unregistered thread, the method comprising:

obtaining a current time;

creating a thread manager;

registering a part of the threads as the registered threads by the thread manager and respectively logging an ideal time interval, a maximum allowed time interval and a minimum allowed time interval of the registered threads, wherein a difference between the maximum allowed time interval and the minimum allowed time interval is greater than or equal to a unit time in an idle mode of the processor, wherein the ideal time interval, the maximum allowed time interval and the minimum allowed time interval are times of the unit time;

calculating a time interval between the current time and a time for the processor to wake up next time;

releasing the processor until reaching the end of the time interval;

when receiving a first notice signal of the processor prior to the end of the time interval, obtaining a first newest time to update the current time, logging the current time as a basis time and respectively checking whether or not the current time satisfies a plurality of predetermined time conditions of the at least one registered thread, wherein the first notice signal corresponds to an operation state of the at least one unregistered thread; and when the current time satisfies the predetermined time condition of a first registered thread among the registered threads, waking up the first registered thread.

* * * * *